United States Patent [15] 3,660,932
Raffeli et al. [45] May 9, 1972

[54] DEVICE FOR CONTROLLABLY CAUSING DOLLS EYES AND TONGUES TO MOVE AND ELECTRONIC CONTROL FOR SAID DEVICE

[72] Inventors: Corrado Raffeli, Via dei Chiavari 6; Giuliana Somigli, Via L Ruspoli 40, both of Rome, Italy

[22] Filed: May 12, 1969

[21] Appl. No.: 823,769

[30] Foreign Application Priority Data

May 17, 1968 Italy...................37048A/68

[52] U.S. Cl.............................................46/235, 46/169 A
[51] Int. Cl.......................................A63h 3/40, A63h 33/26
[58] Field of Search............................46/169 R, 169 A, 235

[56] References Cited

UNITED STATES PATENTS 3,383,793 5/1968 Bonnano..................................46/235
3,492,760 2/1970 Nishitani..............................46/169 X Primary Examiner—Louis G. Mancene
Assistant Examiner—Robert F. Cutting
Attorney—Robert E. Burns and Emmanuel J. Lobato

[57] ABSTRACT

A movable eye or tongue for a doll is provided on the outer surface of a hollow substantially hemispherical member rotatably attached to a hollow support in the dolls head. Electromagnetic means are provided to move the eye or tongue and advantageously comprise a multivibrator circuit supplying a coil on the support the magnetic field of which displaces a permanent magnet on the hemispherical member. The eye and mouth can be linked and can also be dependent upon a voice mechanism.

8 Claims, 9 Drawing Figures

PATENTED MAY 9 1972

DEVICE FOR CONTROLLABLY CAUSING DOLLS EYES AND TONGUES TO MOVE AND ELECTRONIC CONTROL FOR SAID DEVICE

This invention relates to toys and in particular to movable organs such as eyes and tongues for dolls, puppets and the like.

Dolls provided with a device, operable by an external pushbutton or by movement of the doll, for generating simple noises, such as laughter or crying, words or full sentences with a human voice are known. Such devices are essentially based on sound reproduction of noises, sentences or words preliminary recorded on a record.

Heretofore, dolls provided with these devices have not been provided with other means which, in conjunction with the "voice," would confer a greater veracity to the attitude of the doll. In other terms, where the doll's voice reproduces a baby's laughter or crying, the doll's face attitude is unaltered and therefore the make-believe effect is unsatisfactory.

Since the moving parts of the face are those which confer the imprint of veracity on human attitudes, attempts have been made to imitate, for example, the mobility of the eyes and mouth.

Thus, nowadays most dolls have movable eyes, but the eyes are made to move only when the doll is being moved. Further, in a doll provided with a "voice" there is no relation between the voice and the eye movement.

According to the main aspect of the invention there is provided a movable organ for a doll, puppet or the like, said organ being an eye or tongue on the outer surface of a hollow substantially hemispherical member, said member being rotatably attached to a hollow support forming the rear, fixed portion of said organ, and means for rotating said member relative to said support comprising an electromagnet on said support or on said member and a corresponding magnetizable member or permanent magnet on said member or on said support respectively.

The invention will now be described with reference to several embodiments thereof and to the accompanying drawings, in which.

Figure 1:
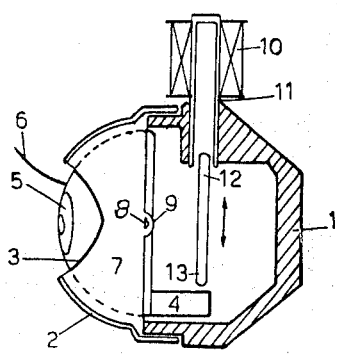
FIGS. 1, 2 and 3 are longitudinal sectional views showing three possible embodiments for an eye movement system.
Figure 5:
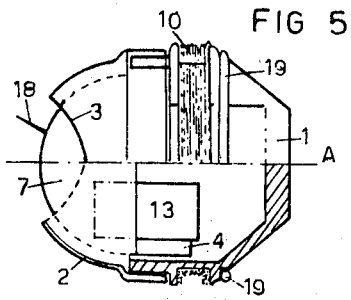

Referring to FIG. 1, there is shown the hollow plastic rear portion 1 of a movable doll eye and an outer eye portion 2 of non-magnetic material being substantially hemispherical with a removed portion 3 so that iris 5 on globe 7 may be seen. The globe 7 is hollow; hemispherical, having a longitudinal axis as indicated by line A in FIG. 5; provided with eyelashes 6; and is fast with a tab 4 inwardly projecting into the bottom of globe 7. Further, by means of pins 8 pivoting in grooves 9 in the edge of portion 1, said globe can rotate about its axis which is coincident with pins 8. Coil 10, for example of copper wire, is wound on a former 11 and electromagnetically attracts the soft iron pin 12, the end 13 of which bears on tab 4 when no current flows through winding 10. Thus, the eye is normally open.

If a current in a suitable direction is passed through coil 10, pin 12 will be attracted into former 11 and release the weight of pin 12 acting on tab 4. Globe 7 can consequently freely downwardly rotate due to the eyelash weight to close the eye.

Figure 2:
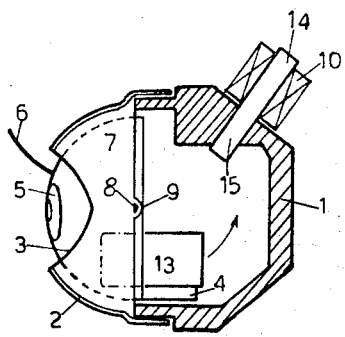

FIG. 2 shows a similar system, wherein a permanent magnet 13 is adhesively attached to tab 4. Coil 10 is wound on a soft iron core 14, an end 15 of which forms a pole-piece capable of attracting the permanent magnet 13. The polarity on the face of the permanent magnet facing pole-piece 15 is opposite to the polarity for the latter, in order that the magnetic forces be attractive forces; alternatively they can be of the same sign when it is desired that the magnetic forces exerted between two magnetic members be repellent. From the foregoing it can be seen that the eye movement can be achieved either when the doll is vertically held, or when it is held horizontally.

Thus, referring to FIG. 2, when the doll is in a vertical position, the eye is normally open, and when desiring to close it the permanent magnet 13 should be attracted in the direction of the arrow whereas when the doll is in a horizontal position, the eye is normally closed and magnet 13 is adjacent pole 15. In this case, to open the eye it will be necessary to repel the magnet 13 by reversing the direction of current flowing within coil 10.

Figure 3:
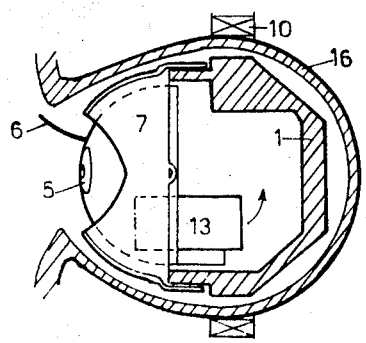

The two embodiments above shown have the drawback of a substantial projection (coil 10) outside of body 1. The embodiment of FIG. 3 partly overcomes this drawback. Thus, coil 10 is annularly shaped and can be inserted outwardly of plastic pocket 16 after that eye 1 containing the permanent magnet 13 has been slipped in to position within the cavity of pocket 16. However, the operation thereof is similar to that for the embodiment shown in FIG. 2. In this case, a practical problem is also encountered. Thus, when slipping the annular coil 10 on pocket 16, an operator may encounter some problem in coil centering, this problem being increased when such an operation exclusively depends upon the manual touch of the operator, this operation being carried out inside a doll and therefore not being visible.

Figure 4:
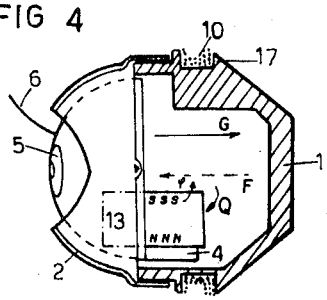
FIGS. 4, 5a and 5b are partial sectional views showing a preferred embodiment of the invention.
Figure 5B:
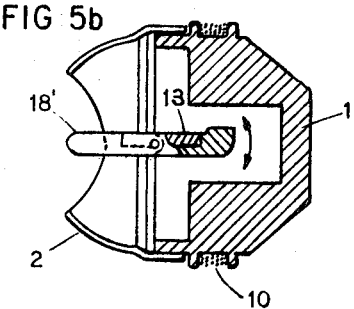

In FIGS. 4, 5a and 5b there is shown a preferred embodiment of the invention, wherein this last drawback is overcome.

Thus, the annular coil 10 is wound within an annular groove 17 in a plastic portion 1 forming the rear supporting portion of the globe. When current flows in coil 10, an axial magnetic field is established in a direction determined by the direction of the current in the coil. Consequently, the permanent magnet 13 tends to align with the axial field so that its face N is directed to S of the axial field and its face S to N of the axial field.

Referring to FIG. 4, assuming that the permanent magnet is arranged with the polarity of its faces as shown, when the axial magnetic field of coil 10 is directed according to arrow G, the magnet will be displaced from the position in the drawing and tend to rotate in the direction of arrow P, thus causing the eye to be closed. Conversely, should the axial field be directed according to arrow F, the magnet would be caused to rotate according to arrow Q and hence, if the eye initially is closed, magnet 13 is adjacent the axis of the field generated by coil 10 and will be displaced to the position shown in FIG. 4 causing the eye to open.

In FIG. 5a there is shown a modification to the embodiment of FIG. 4, wherein instead of carrying an image of an iris 5 and eyelashes 6 said hemisphere 7 carries a tongue-like projection 18, colored the same as the remainder of hemisphere 7, for example pink.

This embodiment is suitable for insertion in a doll mouth, the movable projecting tongue of which assists in providing an expression in conjunction with sounds and/or the eye movement. In FIG. 5a the ferro-magnetic material ring 19 serves to stabilize the movement of magnet 13, developing a weak axial magnetic field limiting at the bottom the position that magnet 13 and hence hemisphere 7 may take up. As shown in FIG. 5b the hemisphere 7 and projection 18 of FIG. 5a may be replaced by a single plate-like, simulated tongue element 18 which is mounted and operated the same as the hemisphere 7.

Figure 6:
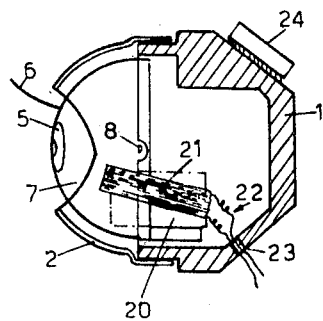
FIG. 6 shows a still further possible embodiment of the invention.

A further embodiment of the present invention is shown in FIG. 6. In this case, the permanent magnet 24 is adhesively attached to the outside of body 1, while a coil 21 is wound on a counter weight 20 fast with tab 4 of hemisphere 7. Magnet 19 provides a magnetic field, to which the magnetic field generated by winding 21 tends to align, provided that the conditions previously illustrated in connection with the polarity for the two magnetic fields apply.

This embodiment, while theoretically possible, may in practice be more difficult to provide because of slack wire 22 to be provided to the two terminal of the coil and which enter body 1 from aperture 23 to allow a complete freedom of rotation of coil 21 about 8.

Figure 7:
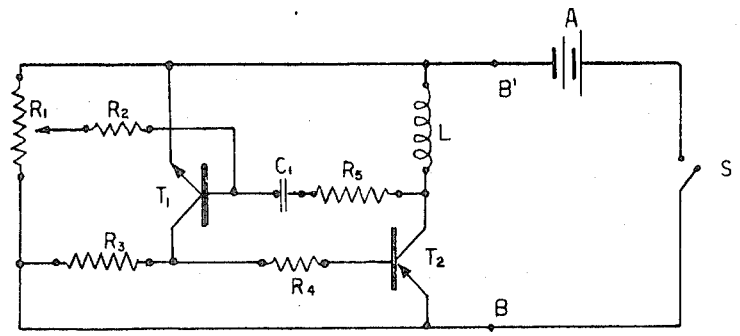
FIG. 7 is a circuit diagram of a controlling electric circuit.

The control circuit is schematically shown in FIG. 7. This is essentially a multivibrator, in the outlet circuit of which coil 10 is connected in series, and therefore passing an alternating current of substantially square waveform generated by the circuit.

Transistors $T_1$ and $T_2$ form a direct loaded amplifier; through network $R_5C_1$ a positive feedback is generated and the circuit oscillates provided that the gain from the base of $T_1$ to the collector of $T_2$ is greater than 1.

The load L comprises a combination of one or more coils 10 connected to one another in series or parallel depending on the dissipation characteristic of transistor $T_2$ and resistance of coil 10.

When $T_2$ is conductive, a current flows within the load and thus, as transistor $T_2$, according to the foregoing, is periodically switched from the conducting to non-conducting state with a frequency determined by network $C_1R_5$ and partly also by $R_1$, the eye movement will be alternating. The commencement of circuit oscillation occurs upon closing switch S, which may be located at an accessible location of the doll.

Where the doll is already provided with another device or devices requiring a source of emf, such as a battery, and where the emf of the latter is not sufficient to operate the circuit of FIG. 7, points B–B' may be directly connected to those points in the circuit for the other device, comprising for example a mechanical voice, wherein the battery emf is present upon actuation thereof.

Figure 8:
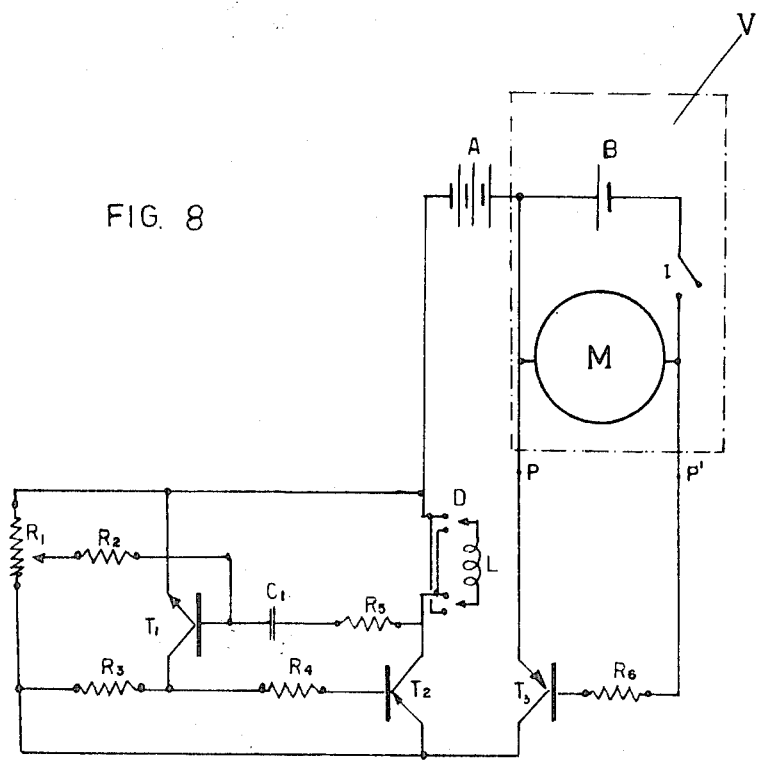
FIG. 8 is a circuit diagram for a preferred electric control circuit.

FIG. 8 shows an improved version of the circuit of FIG. 7. The diagram of FIG. 8 is particularly suitable for use in dolls provided with a mechanical voice, where the battery emf is not sufficient to operate the circuit for eye and/or mouth movement. Portion V within the hatched area of FIG. 8, relates to the mechanical voice, which may exist prior to the connection of the eye movement device, and which typically comprises a supply battery B, an electric motor M driving, for example, a wax or plastic record on which the words or sounds to be played are recorded, and a switch I.

When the switch I is closed, the voltage of battery B is present at the motor fields at points P–P'. If the base of $T_3$ is not biased, transistor $T_3$ is not conductive. Thus, battery A is normally isolated from the circuit as the emitter-collector resistance of $T_3$ is very high. When switch I is closed, the base of $T_3$ is biased through $R_6$ and thus transistor $T_3$ is highly conductive causing the voltage of battery A to be applied to the circuit. In other terms, $T_3$ acts as a gate for the control circuit of eye and/or mouth movement in timed relationship with the operation of the electro-mechanical voice circuit V.

It should be noted in FIG. 8 that load L is connected to the circuit by a switch D serving the purpose of reversing the direction of the current flowing within the load in accordance with the attitude of the doll. Thus, as previously stated, to assure a correct eye movement either when the doll is vertical or horizontal it is required to reverse the flow direction of the current within coil 10. This switch may be of a manual type or a "microswitch," and the lever may be connected to a counter weight so that gravity or position assumed by the doll will be directly operate the switch D.

What is claimed is:

1. A movable organ for a doll, puppet or the like, said organ including a hollow substantially hemispherical member having simulated organ means on an outer surface thereof, a rear support member having said hemispherical member rotatably attached thereto and having an annular slot therein, and means for rotating said hemispherical member relative to said support member comprising a permanent magnet fixed on said hollow member, an electromagnet including an annular coil disposed within said annular slot of said rear support member, and means connected to said coil for supplying current thereto, said coil being disposed so that its magnetic field lies in a longitudinal plane of symmetry of the substantially hemispherical member and normal to the axis of rotation of said hemispherical member, wherein current flow in said coil generates a magnetic field which urges said permanent magnet toward field alignment with said electromagnet, thereby effecting movement of said hemispherical member, and wherein said means connected to said coil for supplying current thereto comprises multivibrator circuit means having an output circuit connected to said coil for periodically energizing said coil to move said hemispherical member.

2. A movable organ for a doll, puppet, or the like, as set forth in claim 1, further comprising additional electrical moving means, and switch means connected to said additional electrical moving means and multivibrator circuit means for simultaneously energizing said additional electrical moving means and said multivibrator circuit means.

3. A movable organ for a doll, puppet, or the like, as set forth in claim 2 in which said additional electrical moving means comprises means for generating a voice sound.

4. A movable organ for a doll, puppet, or the like, as set forth in claim 1 further comprising switch means electrically connected to said multivibrator circuit means, means mounting said switch means for movement with said support member, said switch means comprising a reversing switch means having contacts connected between said coil and said multivibrator output circuit for actuation upon movement of said doll to change the polarity of said electromagnetic field.

5. A doll, puppet or the like, having a movable organ, said organ including a hollow substantially hemispherical member having simulated organ means on an outer surface thereof; a rear support member connected to said doll and having said hemispherical member rotatably attached thereto; and means for rotating said hemispherical member relative to said support member comprising a permanent magnet fixed on said support member, an electromagnet including a coil, means fixedly mounting said coil to said hollow hemispherical member so that the axis of said coil intersects the longitudinal axis of said hemispherical member, and means connected to said coil for supplying current thereto to create a magnetic field which urges the electromagnet to align its field with the field of said permanent magnet whereby movement of said hemispherical member is effected.

6. A doll, puppet or the like, having a movable organ as set forth in claim 5, in which the intersecting angle of said intersecting axes is disposed at substantially 90°, and in which said means for rotating said hemispherical member includes means for disposing said coil axis substantially vertical when said electromagnet field is zero and said doll is vertically disposed, and for disposing said coil axis at substantially 45° with a vertical line when said electro-magnet is energized and said doll is vertically disposed.

7. A doll, puppet, or the like, having a movable organ as set forth in claim 5 having three of said movable organs, in which two of said simulated organ means comprise simulated eye means, and the third simulated organ means comprises a simulated tongue, and in which said coils of said three movable organs are electrically interconnected, whereby all three of said hemispherical members move simultaneously.

8. A movable organ for a doll, puppet or the like, comprising a hollow support housing of non-magnetic material having a longitudinal axis and having an annular slot disposed in its outer periphery, a substantially hemispherical member having means fixed on said hemispherical member for simulating an organ, means rotatably supporting said hemispherical member for rotation with respect to said hollow support housing, a permanent magnet disposed on said hemispherical member, an electromagnet fixedly connected to said hollow support housing and including an annular coil wound within said housing slot and having its axis disposed parallel with said housing axis, means connected to said coil for supplying current thereto for creating a magnetic field axially thereof to cause movement of said permanent magnet, and said hemispherical member attached therewith, about said means rotatably supporting said hemispherical member, and further comprising a ferromagnetic annular ring disposed on said housing coaxially with said slot.

* * * * *